UNITED STATES PATENT OFFICE.

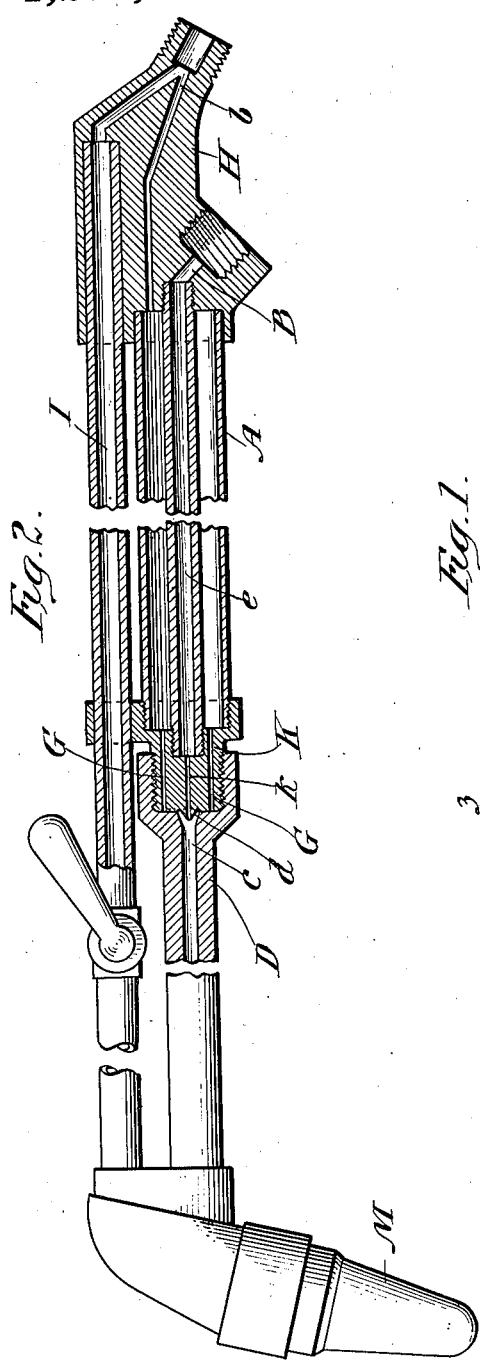
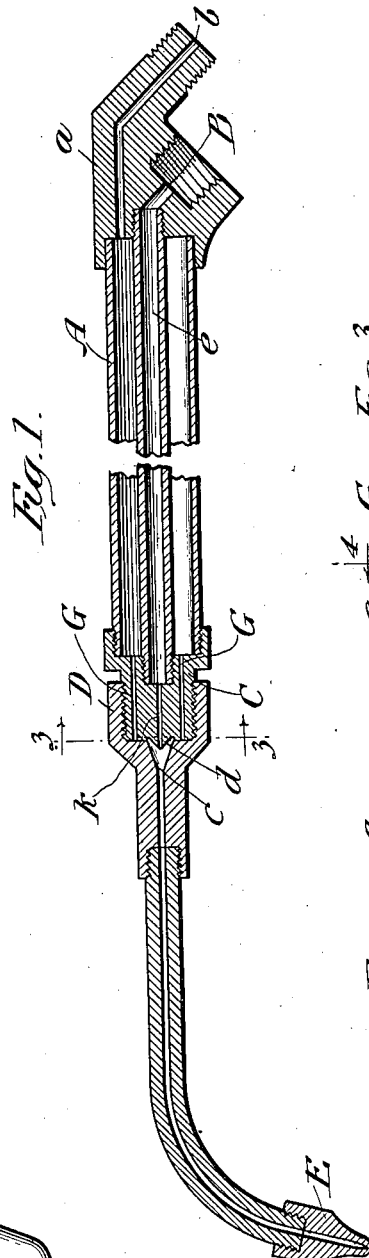
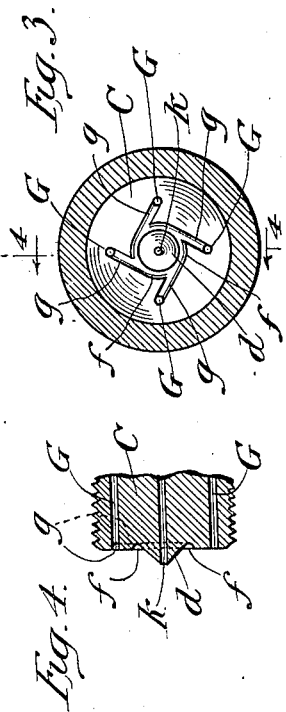

JOHN G. PETTIS, OF CHICAGO, ILLINOIS.

OXYACETYLENE-TORCH.

1,292,367.  Specification of Letters Patent.  Patented Jan. 21, 1919.

Application filed December 14, 1916. Serial No. 136,830.

*To all whom it may concern:*

Be it known that I, JOHN G. PETTIS, a citizen of the United States, residing at Chicago, in the county of Cook and State of Illinois, have invented new and useful Improvements in Oxyacetylene-Torches, of which the following is a full, clear, and exact description.

My invention relates to oxy-acetylene torches, and particularly to the devices therein for mixing the gases.

The object of my invention is to provide a mixing-head for such torches that is simple and economical in construction and is capable of imparting a spiral motion to the expelled gases in such manner as to thoroughly mix the same and prevent the flame issuing from the nozzle of the torch from flashing back to the point of mixture. This I accomplish by the means hereinafter fully explained, and as particularly pointed out in the claims.

In the drawings:

Figure 1 is a longitudinal central section of an oxy-acetylene welding torch embodying my invention.

Fig. 2 is a side view of an oxy-acetylene cutting torch showing the portion thereof inclosing my invention in section.

Fig. 3 is a transverse section taken on dotted line 3—3, Fig. 1, drawn to a larger scale.

Fig. 4 is a central section of the segregated mixing-head of said torch taken on dotted line 4—4, Fig. 3.

Referring to the drawings, A represents the tubular handle of an oxy-acetylene welding torch, the bore of which constitutes a gas-chamber. At its rear end it has a suitable coupling $a$ secured thereto that consists of a metal casting having a smaller longitudinal passage $b$ and a larger longitudinal passage B therein. Passage $b$ discharges into the bore of handle A near its inner circumference, and passage B discharges into a longitudinal pipe $e$ extending centrally through said bore.

The forward end of the tubular handle is screwed into and closed by a mixing-head C. The rear end of this head is, preferably, greater in diameter than its forward end and the adjacent end of the handle is screwed into it, and the forward portion of said head is exteriorly screw-threaded and has the expanded rear end or socket of shank D of a discharge nozzle E screwed over the same until the forward end of the head comes in contact and forms a gas-tight connection with the shoulder resulting from the reduction of the diameter of the bore of said shank, substantially as shown in the drawings.

The rear end of the reduced bore $c$ of the shank is made funnel-shaped, and the center of the forward end of head C is provided with a conical projection $d$, the base of which is slightly less than the diameter of the mouth of the funnel-shaped end of bore $c$ of the shank into which it extends. Head C is provided with an axial passage $h$ that extends therethrough and discharges from the apex of projection $d$ into the reduced bore $c$ of the shank. The rear end of this passage is connected by pipe $e$ with passage B of coupling $a$.

The front end of head C is provided with a concentric circular groove $f$ surrounding the base of projection $d$, and with four-equidistant grooves $g, g, g, g$, that extend tangentially from circular groove $f$. These tangential grooves, preferably, correspond in length, and at their outer ends communicate with equi-distant longitudinal passages G, G, G, G, that are located between axial passage $h$ and the exterior of said head and connect the tangential grooves with the bore of handle A outside of pipe $e$.

In operation, a properly regulated flow of, say, acetylene gas issues under pressure from passage $b$ of coupling $a$ into the bore of the handle and from thence into and through passages G in head C, and a properly regulated flow of, say, oxygen gas issues under pressure from passage B of said coupling through pipe $e$ into and through the central passage $h$. It will be borne in mind that the joint between the forward end of head C and the inner shoulder of the rear expanded end of shank D is gas-tight; the gas discharged from the forward ends of longitudinal passages G in said head is, therefore, directed by grooves $g, g$, into the circular groove $f$ around the base of projection $d$, whose side is inclined more than the surrounding side of bore $c$ and is thus given a circular or helical course as it flows forward around the conical sides of said projection and forces the gas discharged from the apex of the projection to take a spiral course therewith and thoroughly mixes with the same as it passes through the bore of and discharges from the nozzle.

In Fig. 2 of the drawings, I show my improved mixing-head in connection with a cutting-torch. The only difference between head K of this cutting-torch and head C of the welding-torch is that in the former the rear end is built higher to form a guide for the comparatively long stretch of valve-controlled oxygen gas pipe I, which extends from coupling H at the rear end of the torch clear to the nozzle M at the front end thereof outside of the handle and independent of the gas mixing features of the mixing-head.

Having thus described one embodiment of my invention, what I claim and desire to cover by Letters Patent is,

1. An oxy-acetylene torch comprising a nozzle, a shank therefor, and a mixing head having a central conical projection extending from its front end into the bore of said shank and having an axial passage therethrough that receives gas from one source and discharges from the apex of said projection, and a longitudinal passage that receives gas from another source and is located between said axial passage and the exterior of said head; said head having a passageway extending from said longitudinal passage tangentially to the base of said projection.

2. An oxy-acetylene torch comprising a nozzle, a shank therefor, and a mixing-head having a central conical projection extending from its front end into the bore of said shank and having an axial passage therethrough that receives gas from one source and discharges from the apex of said projection, and a longitudinal passage that receives gas from another source and is located between said axial passage and the exterior of said head; said head having a groove in its front end extending from the discharge end of said longitudinal passage tangentially to the base of said projection.

3. An oxy-acetylene torch comprising a nozzle, a shank therefor, and a mixing-head having a central conical projection extending from its front end into the bore of said shank and having an axial passage therethrough that receives gas from one source and discharges from the apex of said projection, and a plurality of equi-distant longitudinal passages that receive gas from another source and are located between said axial passage and the exterior of said head; said head having grooves in its front end extending from the discharge ends of said longitudinal passages tangentially to the base of said projection.

4. An oxy-acetylene torch comprising a nozzle, a shank therefor, and a mixing-head having a central conical projection extending from its front end into the bore of said shank and having a concentric circular groove around the base of said projection, an axial passage therethrough that receives gas from one source and discharges from the apex of said projection, and a longitudinal passage that receives gas from another source and is located between said axial passage and the exterior of said head; said head having a groove in its front end extending from the discharge end of said longitudinal passage tangentially to the circular groove at the base of said projection.

5. An oxy-acetylene torch comprising a nozzle, a shank therefor and a mixing-head having a central conical projection extending from its front end into the bore of the shank, and having a concentric circular groove around the base of said projection, an axial passage therethrough that receives gas from one source and discharges from the apex of said projection, and a plurality of equi-distant longitudinal passages that receive gas from another source and are located between said axial passage and the exterior of said head; said head having grooves in its front end extending from the discharge ends of said longitudinal grooves tangentially to the circular groove at the base of said projection.

6. An oxy-acetylene torch comprising a nozzle, a shank therefor having a funnel-shaped rear end and a mixing-head having a central conical projection extending from its front end into the funnel-shaped rear end of the bore of the shank, and having a concentric circular groove around the base of said projection, an axial passage therethrough that receives gas from one source and discharges from the apex of said projection, and a plurality of equi-distant longitudinal passages that receive gas from another source and are located between said axial passage and the exterior of said head; said head having grooves in its front end extending from the discharge ends of said longitudinal grooves tangentially to the circular groove at the base of said projection.

7. An oxy-acetylene torch comprising a nozzle, a shank therefor having a funnel-shaped rear end, and a mixing-head having a central conical projection extending from its front end into the funnel-shaped rear end of the bore of said shank and having an axial passage therethrough that receives gas from one source and discharges from the apex of said projection, and a longitudinal passage that receives gas from another source and is located between said axial passage and the exterior of said head; said head having a groove in its front end extending from the discharge end of said longitudinal passage tangentially to the base of said projection.

In witness whereof I have hereunto set my hand this 21st day of October, 1916.

JOHN G. PETTIS.

Witnesses:
 FRANK D. THOMASON,
 FLORENCE MITCHELL.